United States Patent [19]
Platman et al.

[11] Patent Number: 5,246,494
[45] Date of Patent: Sep. 21, 1993

[54] MIXED COUPLED AZO PIGMENTS

[75] Inventors: John H. Platman, Hudson, Ohio; James W. Nuss, deceased, late of Rocky River, Ohio, by Marcia Nuss, executrix

[73] Assignee: Engelhard Corporation, Iselin, N.J.

[21] Appl. No.: 823,896

[22] Filed: Jan. 22, 1992

Related U.S. Application Data

[63] Continuation-in-part of Ser. No. 734,515, Jul. 23, 1991, abandoned.

[51] Int. Cl.$^5$ ............... C09B 27/00; C09B 67/22
[52] U.S. Cl. ..................... 106/496; 106/494
[58] Field of Search ................. 106/494, 496

[56]  References Cited

U.S. PATENT DOCUMENTS

| | | | |
|---|---|---|---|
| 2,189,806 | 2/1940 | Lang et al. | 260/202 |
| 2,224,574 | 12/1940 | Martone | 260/197 |
| 3,759,733 | 9/1973 | Bradley et al. | 106/309 |
| 3,775,148 | 11/1973 | Bradley | 106/496 |
| 3,776,749 | 12/1973 | McKay et al. | 106/288 Q |
| 4,251,441 | 2/1981 | Frölich et al. | 260/193 |
| 4,334,932 | 6/1982 | Roueche | 524/191 |
| 4,457,783 | 7/1984 | Hamilton et al. | 106/288 Q |
| 4,602,960 | 7/1986 | Liedek et al. | 106/208 N |
| 4,620,853 | 11/1986 | Tappe et al. | 8/639 |
| 4,731,094 | 3/1988 | Kaiser et al. | 8/639 |
| 4,885,033 | 12/1989 | Blackburn et al. | 106/494 |
| 4,940,492 | 7/1990 | Kowarsch et al. | 106/494 |
| 4,968,352 | 11/1990 | Keys et al. | 106/494 |
| 5,051,131 | 9/1991 | Yuasa et al. | 106/494 |

FOREIGN PATENT DOCUMENTS

| | | |
|---|---|---|
| 235634 | 11/1986 | Czechoslovakia . |
| 880708A | 4/1943 | France . |
| WO9104302 | 4/1991 | PCT Int'l Appl. . |
| 272832A | 4/1951 | Switzerland . |

OTHER PUBLICATIONS

Vol. 4, pp. 1510-1512 of the Colour Index, Third Edition, Revision 1982, Additions and Amendments No. 62, Jan. 1987, Published by the Society of Dyers and Colourists.
PCT International Search Report for PCT/US92/02780, Jan. 1993.
Chem. Abstract: 116: 43082j, 1992.
Chem. Abstract: 115: 94415g, 1991.
Chem. Abstract: 115: 185370e, 1991.
Chem. Abstract: 116: 257360x, 1992.
Chem. Abstract: 105: 99341H, 1986.
ASTM D-656, 1981.

*Primary Examiner*—Mark L. Bell
*Assistant Examiner*—Margaret Einsmann

[57]  ABSTRACT

(1) A mixed coupled azo pigment prepared from:
(A) 30% to 70% of two or more diazonium components, at least one derived from a monoaryl amine and
(B) an organic coupling component, said pigment containing one or more COOH or SO H groups or esters, amides, alkali metal or alkali earth metal salts thereof or (2) A mixed coupled azo pigment prepared from:
(A) 5% to 95% of two or more bis, tris or tetrakis diazonium components, at least one derived from a monoaryl amine and meeting certain specific critria and
(B) an organic coupling component, said pigment comprising the same acid or salt groups of pigment (1).

27 Claims, No Drawings

5,246,494

MIXED COUPLED AZO PIGMENTS

CROSS-REFERENCE TO RELATED APPLICATION

This application is a continuation-in-part of abandoned application Ser. No. 07/734,515, filed on Jul. 23, 1991.

FIELD OF THE INVENTION

The present invention relates to mixed coupled azo pigments and to a process for preparing such mixed coupled azo pigments.

BACKGROUND OF THE INVENTION

Organic azo pigments are well known in the art and are particularly useful as coloring components in various types of printing inks, paints and plastics. Azo pigments are characterized as containing one or more azo groups (i.e., —N=N—). Azo pigments are prepared from various aromatic amines by a two-step process involving diazotization and coupling. The choice of amine is determined by the color and properties of the dye prepared from the amine, the cost of the amine, the ease of diazotization, stability of the diazonium salt, etc.

Diazotization involves treating a primary aryl amine with nitrous acid to form a diazonium salt. The diazonium salt is then reacted with a coupling agent to form the azo pigment. Coupling agents used to prepare azo pigments contain an active hydrogen atom bound to a carbon atom, and examples of types of compounds which have been used as azo coupling agents include compounds containing a phenolic hydroxyl group such as phenols and naphthols, aromatic amines, compounds that contain enolyzable ketone groups of an aliphatic character and some heterocyclic compounds such as those containing pyrrole, indole, and similar ring systems.

Azo pigments may be subdivided chemically according to the number of azo groups present in the pigment such as monoazo, disazo, trisazo, tetrakisazo, etc. Diaryl pigments containing coupled mixed bis-diazotized diamines and acid-substituted aromatic amines are described in U.S. Pat. No. 4,968,352. The pigments are obtained by coupling a bis-diazotized-substituted benzidine and a diazotized primary aromatic acid amine as well as mixtures of such amines with acetoacetanilides or with pyrazolinones. Generally, the amount of the aromatic acid amine employed ranges from about 0.25 to about 15% by weight of the final pigment, and preferably, the acid amine is used at a level of about 0.1 to about 15 mole percent based on the moles of the acetoacetanilide coupler. The pigments may be prepared by diazotizing a mixture of the benzidine and the aromatic acid amine and thereafter coupling the diazotized mixture.

U.S. Pat. No. 4,251,441 describes pigments of mixtures of methoxynitrobenzene-azo-methoxy acetanilides. The mixtures are prepared by diazotizing a mixture of 5-nitro-2-amino-anisol and 3-nitro-4-aminoanisol and thereafter coupling the diazotized mixture with acetoacetic acid-o-anisidide. The anisol mixture may contain from 75 to 85% by weight of the 5-nitro derivative and from 15 to 25% of the 3-nitro derivative. The mixtures obtained are reported to be characterized by a high tinctorial strength, a high gloss, good transparency and good rheological properties.

U.S. Pat. No. 4,602,960 describes modified diarylide pigments. The pigments contain (a) a pigment which is composed of a tetrazotized benzidine coupled to an acetoacetarylide and/or a 1-phenyl-3-methyl pyrazole-5-one, and (b) a water-soluble component obtained from a symmetric or asymmetric coupling product of a tetrazotized 4,4'-diamino-2,2'-stilbene disulfonic acid and an acetoacetarylide and/or a 1-phenyl-3-methyl-5-pyrazollone.

U.S. Pat. No. 4,885,033 describes pigments based on acetoacetarylide derivatives. The pigment composition which is suitable for use in modern offset and letter press inks comprises the mixture of (A) (a) a pigment which may be derived from a mixed coupling of two or more coupling agents and tetrazotized (or bis-diazo) 3,3'-dichlorobenzidine, (b) a dyestuff derived from specified coupling agents onto tetrazotized benzidine-2,2'-disulfonic acid; and optionally (c) a resin; and (B) (a) a pigment derived from one or more specified coupling agents onto one or both of tetrazotized 3,3'-dichlorobenzidine and tetrazotized 3,3'-dimethoxybenzidine and (b) an aliphatic amine.

The ratio of components (A) and (B) in the pigment composition ranges from 35:65 to 95:5. The dyestuff of (B) (a) may include mixed coupled azo pigments prepared from one or more coupling agents with one or two tetrazotized dichloro or dimethoxybenzidines.

Various types of mixed coupled azo pigments are described in Vol. 4, pp. 1510–12 of the *Colour Index*, Third Edition, Revision 1982, Additions and Amendments No. 62, January 1987, Published by the Society of Dyers and Colourists. In particular, two types of "mixed couplings" are described. In the case of yellow pigments, each is described as a product of the reaction between a tetrazotized diamine (D) (i.e., a bis-diazo component) and two coupling components (E) and (E'). Such reactions are reported to produce three definite compounds, i.e., E-D-E, E'-D-E' and E-D-E'. Specific examples of such yellow pigments identified in the color index are C.I. pigment yellow 114, C.I. pigment yellow 126, C.I. pigment yellow 127 and C.I. pigment yellow 176 at page 1512. Red pigments which are "mixed couplings" are described as formed by reaction of one amine (A) and two coupling components (E) and (E'). Such coupling reactions produce a mixture of two components, i.e., A-E and A-E' in proportions defined by the concentrations of (E) and (E') in the reaction mixture. It is reported that these reactions in situ can produce synergistic effects not obtained by physical admixture of the two components. C.I. pigment red 184 and C.I. pigment red 210 are examples of such mixed couplings found at page 1511.

Czech Patent 235,634 describes a pigment which is prepared through the coupling of a mixture of diazotized p-amino acetanilide and p-aminobenzamide with 2-hydroxy-3-naphthoyl-o-anisidide. The Czech patent describes in Example 1, that the coupling is completed by heating to 60° C. and adding an aqueous solution containing 6 grams of potassium colophony followed by 3 grams of calcium chloride. The colophony or calcium colophony is included in the pigments apparently to provide improved properties.

SUMMARY OF THE INVENTION

A mixed coupled azo pigment is described which is prepared from (A) a mixture comprising from about 5 to about 95% by weight of each of two or more diazonium components derived from aromatic amines provided that:
(A-1) if one of the aromatic amines in the mixture contains a carboxamide group, then the other amine in the mixture is a diaryldiamine; or
(A-2) the mixture comprises about 20 to about 80% of each diazonium component when one of the aromatic amines contains a carboxylic acid, sulfonic acid, or salt thereof, and the other aromatic amine is a diaryldiamine; or
(A-3) the mixture comprises from about 30 to about 70% of each of the diazonium components when the aromatic amines in the mixture contain a nitro group; and
(B) an organic coupling component, provided that when the coupling component is a 2-naphthol characterized by the formula

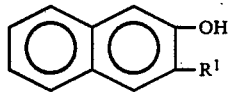

wherein $R^1$ is hydrogen or —COOH, the mixture (A) may comprise from about 5 to about 95% by weight of each of two or more diazonium components derived from aromatic amines containing carboxamide groups, and the mixture does not have to contain a diaryldiamine.

The mixed coupled azo pigments of the present invention involving combinations of at least two amines generally exhibit unique performance characteristics which are not exhibited by physical admixtures of pigments prepared from the individual amines and identical coupling components. The pigments of the invention provide unique performance characteristics in inks, plastics, coatings, etc.

DESCRIPTION OF THE PREFERRED EMBODIMENTS

The performance characteristics of the mixed coupled azo pigments of the present invention prepared from a mixture of two or more aromatic amines and a coupling component are generally superior to the characteristics observed for the azo pigments prepared from the individual aromatic amines with the same coupling agent, and the characteristics of mixtures of said individually prepared azo pigments in terms of cleanliness of hue, transparency, tinctorial strength, etc. In addition, the crystal structure of the mixed coupled azo pigments of the present invention, as observed by X-ray diffraction is different from the crystal structure of the individual pigments prepared from one of the aromatic amines in the same coupling agent and is also different from physical mixtures of such individually prepared azo pigments.

In one embodiment, the mixed azo pigments of the invention are prepared from
(A) a mixture comprising from about 5 to about 95% by weight of each of two or more diazonium components derived from aromatic amines provided that:
(A-1) if one of the aromatic amines in the mixture contains a carboxamide group, then the other amine in the mixture is a diaryldiamine; or
(A-2) the mixture comprises about 20 to about 80% of each diazonium component when one of the aromatic amines contains a carboxylic acid, sulfonic acid, or salt thereof, and the other aromatic amine is a diaryldiamine; or
(A-3) the mixture comprises from about 30 to about 70% of each of the diazonium components when the aromatic amines in the mixture contain a nitro group; and
(B) an organic coupling component, provided that when the coupling component is a 2-naphthol characterized by the formula

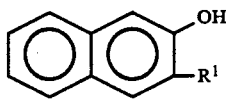

wherein $R^1$ is hydrogen or —COOH, the mixture (A) may comprise from about 5 to about 95% by weight of each of two or more diazonium components derived from aromatic amines containing carboxamide groups, and the mixture does not have to contain a diaryldiamine.

In another embodiment, the mixed azo pigments are water-soluble metal salts of mixed coupled azo pigments prepared by coupling a mixture comprising from about 5% to about 95% by weight of each of two or more diazonium components derived from aromatic amines and an organic coupling component wherein at least one of the diazonium components or the coupling component contains an acidic group and the metal is an alkaline earth metal, a transition metal or aluminum, provided that the mixture comprises from about 20 to about 80% by weight of each of the two diazonium components when one of the diazonium components is derived from a diaryl diamine.

The mixed coupled azo pigments of the present invention are prepared by initially diazotizing a mixture of two or more aromatic amine compounds to form a mixture of diazonium salts, and thereafter coupling the mixture of diazonium salts with a coupling component to form the desired mixed coupled azo pigments.

A variety of aromatic amines can be utilized in the formation of the azo pigments of the present invention. Almost any primary aromatic amine can be used. The aromatic amines may be monoamines or polyamines containing up to 4 or more amine groups per molecule. Thus, the diazonium components derived from such amine may contain one diazonium group (monodiazonium), two diazonium groups (bis-diazonium), three diazonium groups (tris-diazonium), etc. The aromatic amines may be monocyclic amines such as aniline and its derivatives, or bicyclic amines such as naphthyl amine. The aromatic amine may also be a biphenylamine or polyamine such as aminobiphenyl, benzidine, and 3, $3^1$, 4, $4^1$-biphenyltetramine.

In one embodiment, the aromatic amine is a primary aromatic amine characterized by the formula

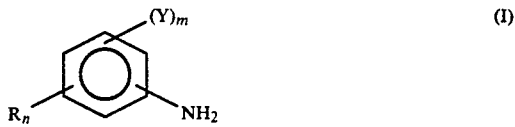

wherein each R is independently hydrogen or a halogen, hydrocarbyl, hydrocarbyloxy or nitro group; n is 0, 1 or 2; each Y is independently —COOH, —SO$_3$H, or the esters or amides or alkali or alkaline earth metal salts thereof; and m is 0, 1 or 2. The term "hydrocarbyl" as used in this specification and claims is intended to include hydrocarbons which may contain substituent groups such as ether, ester, nitro or halogen which do not materially affect the hydrocarbon character of the group.

The aromatic amines characterized by Formula I may contain 0, 1 or 2 R groups which are independently hydrogen or a halogen, hydrocarbyl, hydrocarbyloxy or nitro group. The halogen compound could be any of the halogens although chlorine and bromine are generally used with chlorine being the most preferred example of a halogen substituent. The hydrocarbyl groups may independently be alkyl, cycloalkyl, aryl, aralkyl or alkaryl groups. For example, if R is an unsubstituted aryl group, the aromatic amine is a biphenyl amine. When R is an alkyl group, the alkyl group generally will contain from 1 to 4 carbon atoms. When R is a hydrocarbyloxy group, the hydrocarbyl moiety may be any of the hydrocarbyl groups discussed above although the hydrocarbyloxy group generally is an alkoxy group containing from about 1 to about 4 or more carbon atoms.

The aromatic amines characterized by Formula I also may contain one or two acid groups (Y) which may be —COOH, —SO$_3$H, or the esters or amides or alkali or alkaline earth metal salts thereof. In one preferred embodiment, the aromatic amine of Formula I contains an SO$_3$H group.

Examples of aromatic amines characterized by Formula I where m equals 0 which may be utilized in the present invention include aniline, 2-aminobiphenyl, 4-aminobiphenyl, 2-methoxy aniline (o-anisidine), 3-methoxy aniline (m-anisidine), 4-methoxy aniline (p-anisidine), 3-nitro-2-methoxy aniline, 4-methoxy-3-nitro aniline, o-toluidine, m-toluidine, p-toluidine, 2-chloro aniline, 3-chloro aniline, 4-chloro aniline, 3-chloro-4-methoxy aniline (3-chloro-p-anisidine), 5-chloro-2-methoxy aniline (5-chloro-o-anisidine), 2-chloro-4-methyl aniline, 2-chloro-5-methyl aniline, 2-chloro-6-methyl aniline, 3-chloro-2-methyl aniline, 3-chloro-4-methyl aniline, 3-chloro-4-methyl aniline, 2-nitro aniline, 3-nitro aniline, and 4-nitro aniline.

Examples of aromatic amines characterized by Formula I wherein Y is a sulfonic acid group and m is 1 or 2 include 2-aminobenzene sulfonic acid, 4-aminobenzene sulfonic acid, 2-amino-5-methyl benzene sulfonic acid, 2-amino-5-methoxy benzene sulfonic acid, 3-amino-6-methyl benzene sulfonic acid, 2-amino-4-chloro-5-methyl benzene sulfonic acid, 2-amino-4-ethyl-5-chloro benzene sulfonic acid, 2-amino-4-methyl-5-chloro benzene sulfonic acid, etc.

Examples of aromatic amines characterized by Formula I wherein Y is a carboxylic acid group, and m is 1 include 2-amino benzoic acid, 3,-amino benzoic acid, 4-amino benzoic acid, 2-amino-5-methyl benzoic acid, 2-amino-6-methyl benzoic acid, 3-amino-2-methyl benzoic acid, 2-amino-3-methoxy benzoic acid, 4-amino-3-methoxy benzoic acid, 4-amino-5-chloro-2-methoxy benzoic acid, 2-amino-4-chloro benzoic acid, 3-amino-4-chloro benzoic acid, etc.

The benzene sulfonic acid and benzoic acid compounds can be used per se or as their esters, amides or salts such as alkali or alkaline earth metal salts. Examples of preferred esters include the methyl and ethyl esters, and examples of preferred salts include the alkali metal salts such as the sodium and potassium salts.

The aromatic amines from which the diazonium components are prepared may be fused cyclic aromatic amine compounds such as compounds derived from various naphthalenes including 1-naphthyl amine, 2-naphthyl amine, 2-amino-1-naphthalene sulfonic acid, 4-amino-1-naphthalene sulfonic acid, etc.

Examples of aromatic amines which are biphenyl amines and polyamines include 2-amino biphenyl, 4-amino biphenyl, 4,-4'-diamino biphenyl, 3,3'-dichloro-4,4'-diamino biphenyl, 3,3'-dimethoxy-4,4'-diamino biphenyl, 3,3'-dimethyl-4,4'-diamino biphenyl and 3, 3$^1$, 4, 4$^1$-biphenyltetramine.

In one embodiment, the mixture of aromatic amine may contain from about 5 to about 95% by weight of each of two or more of the above-described aromatic amines. When one of the aromatic amines contains a carboxylic acid or sulfonic acid group, or a salt thereof, and the other aromatic amine is a diaryl amine, the amine mixture comprises about 20% to about 80% of each of the aromatic amines. When one or more of the aromatic amines in the mixtures contains a nitro substituent, the mixture comprises from about 30% to about 70% of each of the aromatic amines.

In another embodiment, the mixture of aromatic amines generally will contain from about 30 to about 70% of at least two amines. In yet another embodiment the mixture will contain from 40 to 60% of each of two amines and may contain additional amines so long as two amines are present in amounts of at least 40% by weight of the mixture.

The mixtures comprising at least two diazonium components used in preparing the pigments of the present invention may be prepared by diazotizing a mixture of aromatic amines, or the mixture can be prepared by separately diazotizing individual amines and combining the diazotized amines. Generally, it is convenient to diazotize a mixture of the aromatic amines and to use this diazotized mixture in the subsequent coupling reaction. The diazotization of the aromatic amines may be carried out in the manners known to those skilled in the art through the use of alkali metal nitrites or lower alkyl nitrites together with an adequately strong acid such as a mineral acid. Examples of useful mineral acids include hydrochloric acid and sulfuric acid. Nitrosyl sulfuric acid also can be utilized. The diazotization reaction can be conducted at a temperature in the range of from about −20° to +30° C., preferably from 0° to 20° C.

Although not required, it may be advantageous in some of the diazotization reactions (and in the subsequent coupling reactions) to include a surface-active agent such as a non-ionic, anionic or cationic surface active agent and optionally appropriate organic solvents such as, for example, glacial acetic acid, lower alkanols, dioxan, formamide, dimethyl formamide, dimethyl sulfoxide, pyridine or N-methyl pyrrolidone.

The coupling component useful in preparing the mixed coupled azo pigments of the present invention may be any compound capable of coupling the diazonium components contained in the mixtures described above.

Among the coupling components which have been described previously are phenols, naphthols, aromatic amines, enolizable carbonyl containing compounds, and heterocyclic compounds such as pyrroles, indoles, and pyrazolones, etc.

The present invention does not depend upon the use of any particular coupling component, although the above-identified types of coupling components are generally preferred. Particularly preferred coupling components include phenols, naphthols and enolizable carbonyl-containing compounds.

Naphthol derivatives are particularly useful coupling components, and these may be represented by the formula

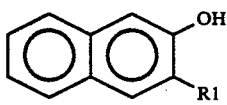 (II)

wherein $R^1$ is hydrogen, —COOH, CONHAr, and Ar is an aromatic group. Preferably $R^1$ is hydrogen or —COOH. Specific examples of such 2-naphthols include: 2-naphthol, 3-hydroxy-2-naphthoic acid, and aryl amides wherein Ar is a phenyl, 2-methylphenyl, 4-methylphenyl, 2-methoxyphenyl, 4-chloro-2-methylphenyl, 3-nitrophenyl, etc.

The coupling component may also be a compound containing an enolizable carbonyl-containing compound characterized by the formula $$XCH_2C(O)Y \quad \text{(III)}$$

wherein X is an electron-withdrawing group and Y is a substituted or unsubstituted amino group. Examples of electron-withdrawing groups include —COR, —COOH, —COOR or —CN wherein R is an alkyl or an aryl group. The amino group Y is generally an aromatic amino group, preferably, a substituted aromatic amino group, preferably, a substituted aromatic amino group which may be represented by the formula

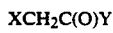 (IV)

wherein B is, for example, phenyl, 2-chloro-phenyl, 2-methoxyphenyl, 2-methyl-4-chlorophenyl, etc.

When the electron-withdrawing group X is $CH_3C(O)$, and Y is an aryl amino group, the coupling compound is generally referred to as an acetoacetyl arylide, and these are particularly useful coupling components in the present invention. The acetoacetyl arylides may be represented by the formula

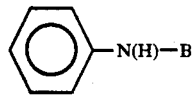 (V)

wherein each $R^2$ is independently hydrogen, halogen, nitro, an alkyl group containing 1 to about 4 carbon atoms, an alkoxy group containing 1 to about 4 carbon atoms or —NHCOCH$_3$, and o is 0,1,2 or 3. Specific examples of such coupling components include acetoacetanilides such as acetoacetanilide, acetoacetyl-2-methylanilide, acetoacetyl-2-methoxyanilide, acetoacetyl-4-ethoxyanilide, acetoacetyl-2,4-dimethylanilide, acetoacetyl-2-methyl-4-chloroanilide, acetoacetyl-2-methoxy-5-chloroanilide, acetoacetyl-2,4-dimethoxy-5-chloranilide and acetoacetyl-2,5-dimethoxy-4-chloranilide.

The coupling reaction for preparing desired mixed coupled azo pigments of the present invention may be effected by adding the coupling component to the mixture of diazonium salts, or the mixture of diazonium salts can be added to the coupling component. Coupling is generally effected at a temperature of from about $-20°$ to about $50°$ C., preferably from about $0°$ to about $40°$ C. As in a diazotization reaction, coupling may be carried out in the presence of an appropriate organic solvent such as all of those identified above for the diazotization reaction.

In one embodiment, the coupling component is dissolved in a basic solution such as an aqueous alkali metal hydroxide solution. In some instances, it is desirable to reduce the pH of the solution to about 5.0–6.0 using an acid such as acetic acid. Generally the mixture of diazonium salts is coupled with an approximately stoichiometric amount of a coupling component. That is, one mole of the diazonium mixture is coupled with about 1 mole of the coupling component.

In one embodiment of the present invention, the dispersibility of the pigment can be improved by adding an alkali-soluble resin-like products before, during, or after the coupling is completed. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combinations of these resins. The resins may be present in a product with free hydroxyl groups that are capable of forming a salt, or may be partially or completely in the form of salts, for example, with alkaline earth metal ions. It may also be advantageous to perform the coupling reaction in the presence of a finely divided insoluble material, for example, alkaline earth metal sulphates and carbonates, titanium dioxide or clay materials or very finely divided organic plastic materials.

When the diazonium salts are prepared from acid amines (i.e., the aromatic amines contain an —SO$_3$H or a —COOH group), or from coupling components containing an acid function, the azo pigments may be precipitated upon completion of the coupling reaction of the addition of a metal base which forms an insoluble sulfonate or carboxylate salt. The metal base may be a base of alkaline earth metals, transition metals, or aluminum. The transition metals are those in Groups IVA through VIIIA, IB and IIB of the Periodic Table. Specific examples of useful metals include Ca, Ba, Cd, Mn, Zn, Ni, Fe, Co, Cr and Al. Alkaline earth metal bases are preferred. Alkaline earth metal bases such as BaCl$_2$ and CaCl$_2$ are useful for this purpose.

In some applications, it is desirable, in order to achieve the full tinctorial strength and the desired favorable crystal structure, to heat the reaction mixture after coupling. For example, the product of the reaction may be heated to reflux temperature for about 1 to 3 hours or at temperatures below 100° C. under pressure in the presence of the above-described resin soaps or other soluble resins.

The azo pigments are recovered from the water-based reaction slurry after completion of the precipitation by filtering to form a presscake which is washed free of salts and used either as is to prepare flushes with oleoresinous vehicles or incorporated directly into aqueous dispersions. Alternatively, the washed presscakes can be dried, ground and used in the form of a coarse or finely divided powder. It is often desired to heat the pigment to an elevated temperature to improve the properties of the pigment. For example, the recovered powder may be heated in air in a temperature of at least about 75° C. at atmospheric pressure or at a lower temperature under reduced pressure.

The following examples illustrate the mixed coupled azo pigments of the present invention and their methods of preparation. Unless otherwise indicated in the following examples and elsewhere in the specification and claims, all parts and percentages are by weight, temperatures are in degrees centigrade and pressures are at or near atmospheric.

The polyamide ink systems used for evaluating some of the pigments is a generally standard formulation comprising by weight,
10% dry pigment and
90% of a vehicle consisting of:
    40% polyamide resin
    30% ethanol
    24% isopropyl alcohol
    6% n-propyl alcohol The air-dry enamel systems used for evaluating some of the pigments is a generally standard formulation comprising by weight,
9.3% dry pigment and
90.7% of a vehicle consisting of:
    86.4% Cargill #5114 Resin
    13.0% mineral spirits
    0.6% mixed metal driers

EXAMPLE 1

A mixture of 6.9 grams of soda ash and 300 ml of water is heated to 80° C. with stirring. To the solution there is added 13 grams of 2-amino-4-chloro-5-methyl benzene sulfonic acid and 13 grams of 2-amino-4-methyl-5-chloro-benzene sulfonic acid, and the mixture is heated to boiling or until complete solution is obtained. To the solution there is added slowly and carefully 26 grams of concentrated hydrochloric acid with stirring and cooling to 50° C. Using ice and cold water, the volume of the slurry is adjusted to 850 ml at 4°-5° C. A solution of 9.1 grams of sodium nitrite dissolved in 30 ml. of water is added at a rate slow enough to prevent fuming and to form a diazonium slurry.

In a separate vessel there is added 22.6 grams of sodium hydroxide (50%) and 22.7 grams of $\beta$-oxynaphthoic acid to 400 ml. of warm water. The mixture is stirred to complete the solution. The solution is poured into a larger container and the volume adjusted to 1500 ml. at 15° C. using cold water and ice as necessary.

The diazonium slurry is added to the $\beta$-oxynaphthoic acid solution over a period of 10 minutes followed by an additional 10 minutes of stirring to complete the coupling. Ice is added to lower the temperature to about 3° C., and a solution of 38 grams of calcium chloride dissolved in 200 ml. of water is added. The mixture is stirred an additional five minutes and a previously prepared solution of 5.4 grams of wood rosin dissolved in 2 grams of 50% sodium hydroxide solution and 150 ml. of water at the boiling point of the mixture is added. This mixture then is stirred for ten minutes, and the pH is adjusted to about 9.5 with dilute acetic acid. The mixture then is heated to 80° C. at 1° C./min.; flooded to 65° C. or below; filtered; washed with water and dried at 180° C.

When the mixed coupled pigment of this example is evaluated in a polyamide ink system and the results are compared to corresponding dry blends of component pigments (i.e., pigments prepared by coupling $\beta$-oxynaphthoic acid with the individual aromatic amines), the co-precipitated material of this example is moderately darker, redder, more transparent and displays higher print tone gloss. The mixed coupled azo pigment of this example also is significantly higher in tinctorial strength.

EXAMPLE 2

A mixture of 0.087 mole of 2-amino-4-methyl-5-chloro benzene sulfonic acid and 0.087 mole of 2-amino-4-ethyl-5-chloro benzene sulfonic acid is prepared in 350 ml. of water on a hot plate with smooth agitation. There is then added 17.2 grams of 50% sodium hydroxide solution while heating the mixture to 70°-75° C. with stirring. Stirring is continued until the solids are completely dissolved. The solution is cooled by stirring to 65° C., and to about 0° to −2° C. by the addition of ice. To this cooled mixture there is added 53 grams of concentrated hydrochloric acid (37%) and the mixture is stirred to obtain a smooth slurry. To the smooth slurry there is then added a solution of 12.4 grams of sodium nitrite dissolved in 50 ml. of water. The mixture is stirred for one hour while maintaining an excess of nitrite at a temperature of 0°-5° C. by the addition of sodium nitrite or ice as necessary. Excess nitrous acid is then eliminated by the addition of 2.2 grams of dry sulfamic acid while keeping the slurry cold.

A $\beta$-naphthol solution is prepared by dissolving 26.5 grams of $\beta$-naphthol in 170 ml. of water and 29.2 grams of 50% sodium hydroxide solution. To this solution there is added a mixture of 6 grams of sodium acetate dissolved in 170 ml. of cold water, and the final volume is adjusted to 800 ml. at 8°-10° C. using cold water and ice as necessary.

The diazonium slurry is added slowly to the $\beta$-naphthol solution drop wise in about 25-30 minutes whereupon the pH of the mixture is adjusted to 8.5-9.0 using hydrochloric acid. The mixture is heated to 78°-80° C. at the rate of about 2° per minute and maintained at this temperature while adjusting the pH to 7.5-8.0. To this mixture there is then added 30 grams of barium chloride dihydrate crystals, and the mixture is stirred for up to 30 minutes or until an orange to red color conversion occurs. The temperature of the mixture is raised at a rate of about 1° C. per minute to a temperature of 94°-96° C. and maintained at this temperature for 10 to 15 minutes. Ice/water is added as necessary to decrease the slurry temperature to below 70° C. The mixture is filtered, washed chloride-free and dried at 60° C. for 24 hours. A dry yield of 75.8 grams is obtained. Compared to a 50:50 mixture of a dry blend of the azo pigment prepared from the individual acid amines and $\beta$-naphthol, the product of this example in an air-dry enamel system is cleaner, brighter and higher in yellow value and tinctorial strength.

EXAMPLE 3

A mixture of 11.2 grams of 50% sodium hydroxide solution, 13.4 grams of 2-amino-5-methyl-benzene sulfonic acid (o-anisidine) and 13.4 grams of 2-amino-4-chloro-5-methyl benzene sulfonic acid is prepared, and 300 ml. of water is added with stirring until clear. Ice is added to a volume of 488 ml. and the temperature is 0°±2° C. Concentrated hydrochloric acid (36.2 grams)

is added with stirring over a period of 4 to 6 minutes. A solution of 10 grams of sodium nitride and 20 ml. of water is added, and the resulting mixture is stirred for 15 minutes at 10°-12° C. while testing for excess acid with Congo Red and for nitrite with potassium iodide paper.

A solution of 27.9 grams of β-oxynaphthoic acid and 21 grams of 50% sodium hydroxide solution in 400 ml. of water is prepared at 50°-60° C. with stirring. The clear solution is allowed to cool to 30° C. and ice is added to a total volume of 860 ml. at 8°-10° C.

The diazonium solution is added to the β-oxynaphthoic acid solution over a period of 5-8 minutes while maintaining a pH at about 6.0-6.4. The pH is then adjusted to 11.2-11.4 with sodium hydroxide (50% solution). Ice is then added to cool the mixture to 8°-10° C. whereupon a rosin solution comprising 7.4 grams of 50% sodium hydroxide solution, 21.8 grams of wood rosin and 135 ml. of water is added. The pH of the mixture is adjusted to 9.7-9.9 with acetic acid (70%) while maintaining the temperature below about 15° C. The mixture is diluted with ice/water to a volume of 1550 ml. After 30 minutes, 40.8 grams of calcium chloride dissolved in 350 ml. of water are added from a dropping funnel over a period of 20 minutes. A pH of about 8.5-8.7 is obtained and the mixture stirred for 2 hours below 15° C. The mixture then is heated at a rate of 1° C./min. to a temperature of 65° C. After flooding to 40°-45° C., the mixture is filtered, and the residue is dried at 70° C. A dry yield of 83.7 grams is obtained. Compared to the corresponding dry blends of the pigments obtained from the individual acid amines and the β-oxynaphthoic acid, the mixed coupled azo pigment obtained in this example in a polyamide ink system is much brighter, cleaner, glossier and more transparent in print tone and displays a cleaner and stronger tint.

EXAMPLE 4

The procedure of Example 3 is repeated except that the 2-amino-4-chloro-5-methyl benzene sulfonic acid is replaced by 13.4 grams of 2-amino-4-methyl-5-chloro benzene sulfonic acid. The mixed coupled azo pigment prepared in this manner in a polyamide ink system, compared to corresponding dry blends of the two pigments prepared by coupling the individual diazonium compounds with β-oxynaphthoic acid, is brighter, cleaner, and glossier and more transparent in print tone, and displays a cleaner and stronger tint.

EXAMPLE 5

A mixture of 0.5 grams of ethylenediamine tetraacetic acid, 26.8 grams of m-nitro-o-anisidine, 26.8 grams of m-nitro-p-anisidine and 242 ml. of cold water is prepared and stirred until a smooth slurry is obtained. Concentrated hydrochloric acid (78.8 grams of 37%) is added, and the mixture is cooled with ice to 0°±2° C. This temperature is maintained throughout the diazotization reaction. A solution of 22.8 grams of sodium nitrite dissolved in 46 ml. of water is prepared and added slowly to the mixture which is then stirred for 35-40 minutes while maintaining an excess of nitrite and "Congo Red" acidity at all times. Excess nitrous acid then is destroyed by the addition of 2.2 grams of dry sulfamic acid crystals.

In a separate vessel a mixture of 330 ml. of water, 0.5 grams of ethylenediamine tetraacetic acid, 27.4 grams of a 50% solution of sodium hydroxide and 27.0 grams of sodium acetate is prepared and heated to 50° C. whereupon 70.5 grams of acetoacet-o-anisidide (AAOA) are added. The mixture is stirred for 25-35 minutes at 48°-52° C. or until completely dissolved. Ice and chilled water are then added to achieve a volume of 1054 ml. at 6°-10° C. Just prior to effecting the coupling reaction, the pH of the coupling solution is adjusted to 5.4-5.8 using about 34.9 grams of 70% acetic acid.

The diazonium solution is added to the AAOA slurry over a period of 1.5-2 hours while maintaining a temperature of 12°-15° C. The mixture is tested for excess diazonium salt periodically, and this test always should be negative. If a positive test for diazonium salt is obtained, no additional diazonium salt solution is added until the reaction balance has been achieved. When the addition of the diazonium is completed, the pH should be 3.7-4.2, and is adjusted as necessary. The mixture is stirred for 10-15 minutes and heated to 15° C. at a rate of 1° C./min. At the 50° C. temperature, the pH is adjusted to 10.3-10.5 by the slow addition of 50 grams of a 50% sodium hydroxide solution. When a stable pH is obtained, a solution comprising 171 ml. of water, 1.6 grams of sodium hydroxide solution, 3.1 grams of Staybelite resin and 3.1 grams of Polypale resin is added over a 20-30 minute period. After stirring for an additional 15-20 minutes, a solution of 6.9 grams of calcium chloride and 30 ml. of water is added. The pH of the mixture is adjusted to 6.8 to 7.0 with concentrated hydrochloric acid, and this mixture is heated at 1° C./min. to 94°-96° C. This elevated temperature is maintained for 2.5 hours, and the mixture is then cooled to below 75° C. The cooled mixture is filtered, washed free of chlorine and dried at 115° C. for 48 hours. A dry yield of 123 grams is obtained, and the mixed coupled pigment obtained when evaluated in an air-dry enamel is significantly cleaner, brighter and higher in tinctorial strength than dry blends of the individual pigments prepared by coupling the individual anisidines with AAOA.

EXAMPLE 6

A mixture of 23.9 grams of dichlorobenzidine, (DCB) 29 grams of concentrated hydrochloric acid and 245 ml. of ice and water is prepared and stirred for 30 minutes to a smooth slurry. To the slurry there is added a solution of 13.7 grams of sodium nitrite in 30 ml. of water. Stirring is continued for one hour while maintaining a temperature plus or minus 2° C. and maintaining a strong excess of nitrite in the mixture. Sulfamic acid (2.2 grams) is then added as needed to neutralize the excess nitrite prior to coupling, and the final volume is raised to 360 ml. by the addition of water.

A second diazonium salt is prepared from a mixture of 24.4 grams of 3,3'dimethoxy benzidine (ortho-dianisidine, ODA), 32.3 grams of concentrated hydrochloric acid and 400 ml. of water by stirring the mixture to 0° C. for 45 minutes until a smooth slurry is obtained. The slurry volume is increased to 532 ml. at 4°-6° C., and a solution of 15.7 grams of sodium nitrite dissolved in 35 ml. of water is added over period of 6 minutes. The temperature of the mixture should be maintained below about 20° C. with the addition of ice if necessary. The mixture is stirred for an additional hour while maintaining an excess of nitrite and hydrochloric acid at all times. Dry sulfamic acid (1.9 grams) is added to eliminate any excess nitrite before coupling. The final volume is increased to 570 ml.

A coupling solution is prepared of 36.0 grams of acetoacetanilide (AAA), 18.1 grams of a 50% aqueous sodium hydroxide solution and 29.1 grams of sodium acetate in 400 ml. of water at 40° C. The mixture is stirred until dissolved and thereafter cooled to 20°–30° C. About 30 minutes prior to coupling, the volume is adjusted to 900 ml. at 22° C. and about 22.5 grams of acetic acid (70%) are added to adjust the pH to 5.0–5.5.

A mixture of 180 ml. of the DCB tetrazonium salt and 285 ml. of the ODA tetrazonium salt is prepared and added dropwise to the coupling solution over a period of 2 hours while maintaining an excess of the acetoacetanilide at all times. The final pH should be 4.4–4.8. The mixture is stirred an additional ten minutes and then heated to 90° C. at a rate of 1° C./min. The mixture is maintained at this temperature for 30 minutes whereupon cold water is added to cool the mixture to below 70° C. The mixture is filtered, washed chloride-free and dried at 60° C. for 16 hours yielding 29 grams of dry pigment. When evaluated in a polyamide ink system, the mixed coupled azo pigment, compared to a dry blend of the pigments prepared from the DCB or ODA with AAA, is much lighter, cleaner, yellower and more transparent in mass tone, and yellower, cleaner and stronger in tint application.

The mixed coupled azo pigments of the present invention, as illustrated in the above examples exhibit a high tinctorial strength, a high gloss, good transparency and good rheological properties. In addition to the above-desirable properties, the mixed coupled azo pigments of the present invention also are characterized as having x-ray diffraction patterns which are distinct from the coupled azo pigments prepared from the individual aromatic amines and the coupling component. The x-ray diffraction pattern of the mixed coupled azo pigments of the present invention also is different from the x-ray diffraction pattern of a physical mixture of the individual pigments. To illustrate, a mixed coupled azo pigment of the present invention prepared from a mixture of two amines (A and A') and a coupling component (C) exhibits an x-ray diffraction pattern which is different from the x-ray pattern of the pigment A-C or the pigment A'-C, or a physical mixture of pigments A-C and A'-C.

Although not wishing to bound by any theory or explanation, it is believed that the mixed coupled azo pigment forms a unique crystal structure wherein one of the coupled pigments acts as a host lattice for the other pigment. This results in a unique lattice structure and in the production of azo pigments having unique and desirable characteristics.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as are embraced within the scope of the amended claims.

It is claimed:

1. A mixed coupled azo pigment prepared from
   (A) a mixture comprising from about 30% to about 70% by weight of each of two bis-diazonium components derived from aromatic amines provided that at least one diazonium component is derived from a monoaryl amine; and
   (B) an organic coupling component provided that at least one of the diazonium components or the coupling component contains one or more —COOH or —SO$_3$H group or the esters or amides or alkali metal or alkaline earth metal salts thereof.

2. The azo pigment of claim 1 wherein the coupling component is selected from the group consisting of phenols, naphthols, aromatic amines, enolizable carbonyl-containing compounds and heterocyclic compounds selected from the group consisting of pyrroles, indoles and pyrazolones.

3. The azo pigment of claim 1 wherein the coupling component is an arylamide of acetoacetic acid.

4. A mixed coupled azo pigment prepared from
   (A) a mixture comprising from about 30% to about 70% by weight of each of two or more diazonium components derived from aromatic amines provided that at least one diazonium component is derived from a monoaryl amine; and
   (B) an organic coupling component which is an enolizable carbonyl-containing compound characterized by the formula

$$XCH_2C(O)Y \quad (III)$$

wherein X is an electron-withdrawing group, and Y is a substituted or unsubstituted amino group provided that at least one of the diazonium components or the coupling component contains one or more —COOH or —SO$_3$H group or the esters or amides or alkali metal or alkaline earth metal salts thereof.

5. The azo pigment of claim 4 wherein X is —COR, —COOH, —COOR or —CN wherein R is an alkyl or aryl group.

6. A mixed coupled azo pigment prepared from
   (A) a mixture comprising from about 30% to about 70% by weight of each of two or more diazonium components derived from aromatic amines wherein at least one of the diazonium components in the mixture is derived from an aromatic amine characterized by the formula

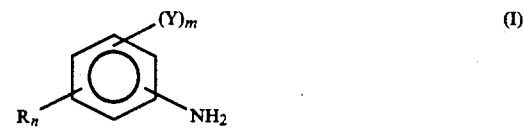

(I)

wherein each R is independently hydrogen or a halogen, hydrocarbyl, hydrocarbyloxy or nitro group; n is 0, 1 or 2; each Y is independently —COOH, —SO$_3$H, or the esters or alkali metal salts thereof; and m is 1 or 2; and
   (B) an organic coupling component which is an enolizable carbonyl-containing compound.

7. The azo pigment of claim 6 wherein the mixture (A) comprises from about 40% to about 60% each of the two diazonium components.

8. The azo pigment of claim 6 wherein the coupling component (B) is an enolizable carbonyl-containing compound characterized by the formula

$$XCH_2C(O)Y \quad (III)$$

wherein X is an electron-withdrawing group and Y is a substituted or unsubstituted amino group.

9. The azo pigment of claim 8 wherein the electron-withdrawing group is —COR, —COOH, —COOR or —CN wherein R is an alkyl or an aryl group.

10. The azo pigment of claim 6 wherein n is 2, one R is a halogen, and the other R is an alkyl group.

11. The azo pigment of claim 6 wherein Y is —SO₃H and m is 1.

12. The azo pigment of claim 6 wherein the mixture (A) contains two of the diazonium components in approximately equal amounts by weight.

13. The azo pigment of claim 6 wherein the coupling component is an arylamide of acetoacetic acid characterized by the formula

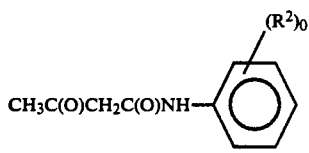 (V)

wherein each $R^2$ is independently hydrogen halogen, nitro, alkyl group containing 1 to about 4 carbon atoms, alkoxy group containing 1 to about 4 carbon atoms, or —NHCOCH₃ and o is 0, 1, 2 or 3.

14. A metal salt of a mixed coupled azo pigment prepared by coupling a mixture comprising from about 30% to about 70% by weight of each of two or more diazonium components derived from aromatic amines with an organic coupling component which is an enolizable carbonyl-containing compound and wherein at least one of the diazonium components is derived from a monoarylamine and contains an acidic group, and the metal is an alkaline earth metal, a transition metal or aluminum, or combinations thereof.

15. The metal salt of claim 14 wherein the acidic group is a carboxylic acid group or a sulfonic acid group.

16. The metal salt of claim 14 wherein at least one of the diazonium components is derived from an aromatic amine characterized by the formula

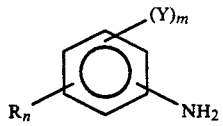 (I)

wherein R is independently hydrogen or a halogen, hydrocarbyl, hydrocarbyloxy or nitro group; n is 0, 1 or 2; each Y is independently —COOH or —SO₃H; and m is 1 or 2.

17. The metal salt of claim 14 wherein the metal is an alkaline earth metal.

18. The metal salt of claim 17 wherein the acidic group is a carboxylic or sulfonic acid group.

19. The metal salt of claim 17 wherein the acidic group is a sulfonic acid group.

20. The metal salt of claim 17 wherein the metal is calcium.

21. The metal salt of claim 17 wherein at least one of the diazonium components is derived from an aromatic amine characterized by the formula

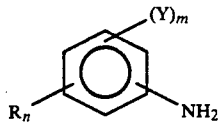 (I)

wherein R is independently hydrogen or a halogen, hydrocarbyl, hydrocarbyloxy or nitro group; n is 0, 1 or 2; each Y is independently —COOH or —SO₃H; and m is 1 or 2.

22. The metal salt of claim 21 wherein m is 1.

23. The metal salt of claim 21 wherein Y is —SO₃H and m is 1.

24. The metal salt of claim 14 wherein the coupling component is an enolizable carbonyl-containing compound characterized by the formula

XCH₂C(O)Y (III)

wherein X is an electron-withdrawing group and Y is a substituted or unsubstituted amino group.

25. The metal salt of claim 24 wherein X is —COR, —COOH, —COOR, or —CN wherein R is an alkyl or aryl group.

26. The metal salt of claim 21 wherein the mixture comprises from about 40 to about 60% of each of two diazonium components.

27. A mixed coupled azo pigment prepared from
(A) a mixture comprising from about 5 to about 95% by weight of each of two or more diazonium components derived from aromatic amines wherein at least one of the diazonium components is a bis-, tris- or tetrakis-diazonium component provided that at least one diazonium component is derived from a monoaryl amine, and further provided:
(A-1) if one of the aromatic amines in the mixture contains a carboxamide group, then the other amine in the mixture is a diaryldiamine; or
(A-2) the mixture comprises about 20 to about 80% of each diazonium component when one of the aromatic amines contains a carboxylic acid, sulfonic acid, or salt thereof, and the other aromatic amine is a diaryldiamine; or
(A-3) the mixture comprises from about 30 to about 70% of each of the diazonium components when the aromatic amines in the mixture contain a nitro group; and
(B) an organic coupling component, provided that at least one of the diazonium components in (A) or the coupling component contains one or more —COOH or —SO₃H group or the esters or amides or alkali metal or alkaline or metal salts thereof, and further provided that when the coupling component is a 2-naphthol characterized by the formula

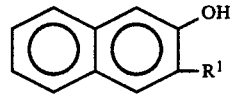

wherein $R^1$ is hydrogen or —COOH, the mixture (A) may comprise from about 5 to about 95% by weight of each of two diazonium components derived from aromatic amines containing carboxamide groups, and the mixture does not have to contain a diaryldiamine.

* * * * *